United States Patent [19]

Henderson

[11] Patent Number: 4,778,988

[45] Date of Patent: Oct. 18, 1988

[54] DISPLACEMENT DETECTION

[76] Inventor: Phillip J. Henderson, 11, Rodney Street, Liverpool, L1 9EF, England

[21] Appl. No.: 113,243

[22] Filed: Oct. 26, 1987

[30] Foreign Application Priority Data

Oct. 24, 1986 [GB] United Kingdom ............. 8625471

[51] Int. Cl.$^4$ ............................................. G01D 5/26
[52] U.S. Cl. ............................. 250/226; 250/231 R; 356/405; 356/373
[58] Field of Search ................. 250/226, 231 R; 356/405, 373

[56] References Cited

U.S. PATENT DOCUMENTS 4,408,123 10/1983 Sichling et al. ............ 250/231 R X
4,705,354 11/1987 Ulrich ......................... 250/231 R X Primary Examiner—Vincent P. McGraw
Attorney, Agent, or Firm—Anthony J. Casella; Gerald E. Hespos

[57] ABSTRACT

Apparatus for determining displacement of an object comprises a light source (1) for propagating polychromatic light along a path to a detector (7). Radiation modulation means such as a filter (5) is provided in predetermined fixed location with respect to the source (1) and the path of the light is adjusted in response to a displacement of the object such as to vary the distributed spectral content of the light reaching the detector (7). The detector comprises first and second photoresponsive elements (10, 11), of differing responsivity with respect to wavelength, and a microprocessor (14) receiving signals from the photoresponsive elements. The microprocessor calculates the color of the light incident on the detector (7) as represented by two or more parameters on the chromaticity (CIE) diagram, and interprets the color of the light incident on the detector (7) in terms of the displacement of the object.

12 Claims, 2 Drawing Sheets

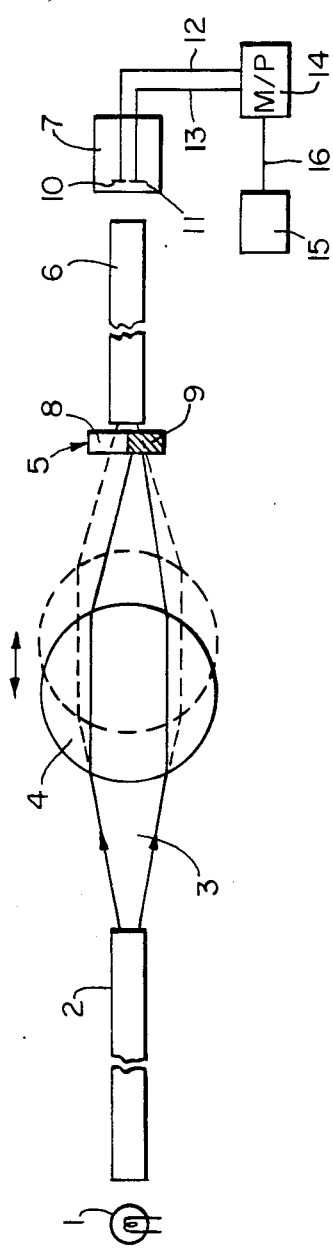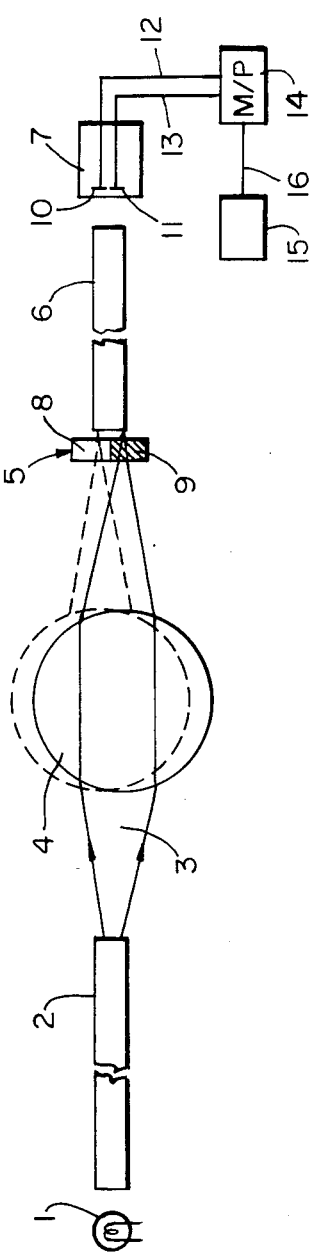

DISPLACEMENT DETECTION

This invention relates to the detection of the displacement of an object. Parameters such as position, velocity, acceleration, pressure and temperature can all be translated into a displacement and determined by the detection of that displacement.

Displacement measuring systems are known in which a spectral splitting device, such as a prism or grating, splits a light beam into its wavelength components. Displacement of the spectral splitting device is measured by the detection of the wavelength received at a given detection point. The present invention provides an improvement to this type of displacement measuring system.

Accordingly there is provided apparatus for determining displacement of an object comprising a light source for propagating polychromatic light along a path to a detector; radiation modulation means in predetermined fixed location with respect to the detector; means for adjusting the path of the polychromatic light such as to vary the distributed spectral content of the light reaching the detector, the path adjustment means being responsive to the displacement of the object; and analysis means; the detector comprising at least first and second photo-responsive elements, the responsivity with respect to wavelength of the first element being different from that of the second, signals from the photo-responsive elements being fed to the analysis means which calculates, from the signals from the photo-responsive elements, the colour of the light reaching the detector as represented by two or more parameters on the chromaticity (CIE) Diagram, the analysis means being adapted to interpret the colour of the light reaching the detector in terms of the displacement of the object.

At least two photoresponsive elements are required, the responsivity with respect to wavelength of the first element being different from that of the second. In one convenient arrangement two different photoresponsive elements are employed, each with its own wavelength responsivity characteristic. Alternatively, one or both of the photoresponsive elements includes a coloured filter to impart a colour response characteristic, thereby allowing two identical photoresponsive elements to be employed, if desired. Preferably the responsivity with respect to wavelength of the first and second photoresponsive elements are such that their respective wavelength/intensity curves overlap for at least part of the wavelength spectrum.

A change in colour is therefore determined by assessing the change in the whole of a selected part of the spectrum (colour modulation) as opposed to merely detecting the change at one or more selected wavelengths (wavelength modulation). Thus a change from colour A (represented by a wavelength/intensity curve A) to colour B (represented by wavelength/intensity curve B) will be calculated from the area between the two curves thereby giving a more complete analysis of 'true' colour. Wavelength modulation is limited in that it is a calculation based on the distance between the two curves at one or more selected wavelengths.

by the term 'polychromatic light' there is herein meant any multi-wavelength radiation, and is specifically meant to include both visible light and infra-red radiation. The term 'colour' whilst used herein for ease of understanding, should in no way imply that only visible light may be employed. Where the apparatus employs radiation outside the visible spectrum, the term 'colour' will refer to the spectral distribution of the radiation.

Preferably there is provided a focusing element adapted to focus the polychromatic light on to the radiation modulation means. Conveniently the path adjustment means comprises means for moving the focusing element in response to a displacement of the object. Movement of the focusing element varies the proportion of the light beam which passes through the radiation modulation means, thereby varying the colour of the beam reaching the detector. Additionally or alternatively there is provided a reflective surface positioned such as to reflect the focused polychromatic light on to the radiation modulation means, the path adjustment means comprising means for moving one or both of the focusing element and reflective surface so as to vary the distance therebetween. A change in the distance between the focusing element and the reflective surface will again vary the proportion of the light beam which passes through the radiation modulation means. Preferably the reflective surface is movable with respect to the focusing element in response to displacement of the - 4 object. Conceivably, the reflective surface is provided by the object the displacement of which is to be determined, typically in the form of a reflective diaphragm in a pressure sensor.

In one convenient arrangement the radiation modulation means is integrally formed within the focusing element. The focusing element is conveniently in the form of a sphere, or alternatively a cylinder, preferably of optically transparent glass.

The radiation modulation means preferably comprises a filter which attenuates the intensity of transmitted wavelengths to different degrees. The filter conveniently comprises an elongate element the colour absorption characteristics of which vary along its length. In one convenient arrangement the filter comprises an elongate element having a coloured portion and a transparent portion and wherein the transition between said coloured and transparent portions occurs at a sharply defined edge. Conveniently the sharply defined edge extends obliquely relative to the longitudinal axis of the elongate element. Where the radiation modulation means is integrally formed within the focusing element, it may conveniently comprise a coloured code, spherical or cylinderical in shape depending on the shape of the focusing element.

The invention further resides in an method of determining displacement of an object employing apparatus as herein described. In particular, a method of detecting displacement of an object comprises the steps of propagating polychromatic light along a path to a detector; supporting radiation modulation means in predetermined fixed location with respect to the detector; adjusting the path of the polychromatic light in response to the displacement of the object such as to vary the distributed spectral content of the light reaching the detector; detecting the light reaching the detector with at least first and second photo-responsive elements, the responsivity with respect to wavelength of the first element being different from that of the second; calculating, from the signals from the photo-responsive elements, the colour of the light reaching the detector as represented by two or more parameters on the chromaticity (CIE) Diagram; and interpreting the colour of the light reaching the detector in terms of the displacement of the object.

FIG. 1 is a schematic diagram of apparatus according to the invention;

FIGS. 2 to 4 are schematic diagrams of alternative embodiments of apparatus according to the invention;

Figure 3:
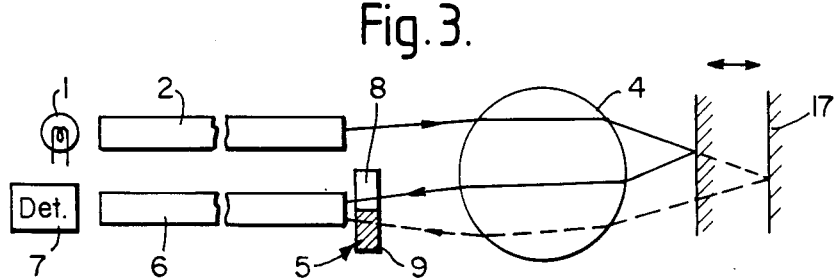

Referring to FIGS. 1 and 2, displacement sensing apparatus comprises a light source 1, adjacent which is an octical fibre 2 which transmits light from the source 1 to a gap 3 in which is provided a transparent sphere 4 and a chromatic modulator 5. Light traversing the gap 3 is transmitted by means of a further optical fibre 6 to a detector shown generally at 7.

The sphere 4 is mounted so as to be movable in response to the displacement to be measured, either in a longitudinal direction as shown in FIG. 1, or in a lateral direction as shown in FIG. 2. The chromatic modulator 5 comprises a filter element, including a colourless portion 8 and a coloured portion 9, with a sharp division therebetween. The detector 7 comprises two photoresponsive elements 10 and 11, the responsivity of which with respect to wavelength differs one from the other. Signals from the elements 10 and 11 are fed via lines 12 and 13 respectively to a microprocessor 14. The output of the microprocessor activates a display unit 15, signals being passed thereto via line 16.

As the sphere 4 moves as a result of the displacement, its focusing effect upon the light emerging from the optical fibre 2 is altered, causing a different proportion of the light to be passed through the coloured portion 9 of the chromatic modulator 5. This causes a change in the colour of the light reaching the detector 7. The light impinging on the photoresponsive elements 10 and 11 produces two different output signals, which signals are analysed by the microprocessor 14. The microprocessor 14 calculates the colour of the light in terms of two parameters on the Chromaticity (CIE) Diagram from the signals from the photoresponsive elements 10 and 11. The parameters are compared with those in a look-up table stored in a read only memory of the microprocessor, and the corresponding value of the displacement is obtained. The displacement is then displayed by means of the display unit 15, which is typically an LED display.

Figure 4:
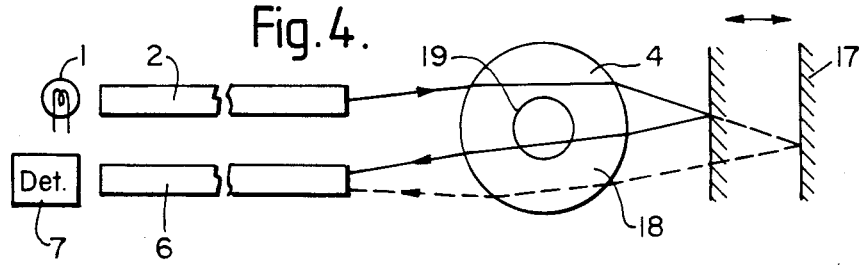

FIG. 3 shows a version of the apparatus in which the light emerging from the optical fibre 2 passes through the sphere 4 and is reflected by a reflective diaphragm 17. The refelected light passes back through the sphere 4 before passing through the chromatic modulator 5 and reaching the detector 7 as before. In this version of the apparatus the diaphragm 17 and not the sphere 4 moves in response to the displacement to be measured, the diaphragm moving longitudinally as shown in FIG. 3. This causes a change in the path of the light passing back through the sphere and hence the proportion of light passing through the coloured portion 9 of the chromatic modulator 5. The colour of the light reaching the detector is analyised as before to give an indication of the displacement of the diaphragm. FIG. 4 shows a version of the apparatus of FIG. 3 in which the sphere and chromatic modulator are merged into a single unit. The sphere 4 comprises a transparent outer portion 18 with a coloured core 19. As before the movement of the diaphragm 17 changes the path of the light through the sphere and hence the proportion of the light passing through the coloured core 19. This produces the change of colour at the detector 7 required to indicate a displacement of the diaphragm 17.

Figure 5:
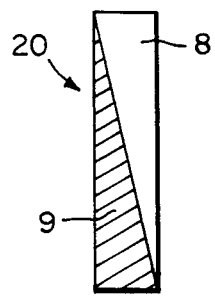
FIG. 5 is a schematic diagram of an embodiment of modulating element for use in the apparatus of FIGS. 1 to 3.

FIG. 5 shonws an alternative chromatic modulator 20, which can be used instead of the chromatic modulator 5 in the displacement detecting apparatus of FIGS. 1 to 3. The modulator 20 comprises a colourless portion 8 and a coloured portion 9 as before, but in the modulator 20 the division therebetween is at an oblique angle. This type of modulator provides a more gradual change in colour along its length than the modulator 5.

Figure 6:
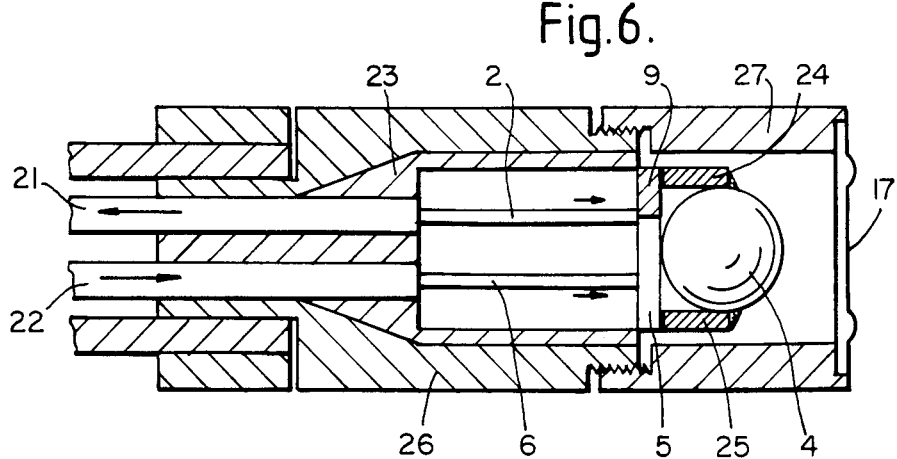
FIG. 6 is a sectional diagram of one practical embodiment of apparatus according to the invention.

FIG. 6 shows a compact form of sensing head such as would be used in an industrial sensor. The optical fibres 2 and 6 are located within a housing 26 and are connected to larger fibres 21 and 22 encased in resin shown generally at 23. The chromatic modulator 5 is in the form of a glass filter and the sphere 4 is mounted by means of supports 24, 25. A casing 27, removably connected to the housing 26, includes the diaphragm 17. This arrangement is suitable for use as a pressure sensor.

What is claimed is:

1. Apparatus for determining displacement of an object comprising a detector; light source (1) for propagating polychromatic light along a path to the detector; radiation modulation means in predetermined fixed location with respect to the detector; means for adjusting the path of the polychromatic light such as to vary the distributed spectral content of the light reaching the detector such that the path adjustment means is responsive to the displacement of the object; and analysis means; the detector comprising at least first and second photo-responsive elements, with the responsivity with respect to wavelength of the first element being different from that of the second, means for feeding signals from the photo-responsive elements to the analysis means, the analysis means calculating from the signals from the photo-responsive elements the colour of the radiation incident on the detector as represented by two or more parameters on the chromaticity (CIE) Diagram, the analysis means interpreting the colour of the radiation reaching the detector in terms of the displacement of the object.

2. Apparatus according to claim 1 wherein there is provided a focusing element for focussing the polychromatic light on to the radiation modulation means.

3. Apparatus according to claim 2 wherein the path adjustment means comprises means for moving the focusing element in response to displacement of the object.

4. Apparatus according to claim 2 wherein there is provided a reflective surface positioned such as to reflect the focused polychromatic light on to the radiation modulation means, the path adjustment means comprising means for moving one or both of the focusing element and the reflective surface so as to vary the distance therebetween.

5. Apparatus according to claim 4 wherein the reflective surface is movable with respect to the focusing element in response to a displacement of the object.

6. Apparatus according to claim 5 wherein the reflective surface is provided by the object the displacement of which is to be determined.

7. Apparatus according to claim 4 wherein the radiation modulation means is integrally formed within the focusing element.

8. Apparatus according to claim 1 wherein the radiation modulation means comprises a filter which attenuates the intensity of transmitted wavelengths to different degrees.

9. Apparatus according to claim 8 wherein the filter comprises an elongate element the colour absorption characteristics of which vary along its length.

10. Apparatus according to claim 9 wherein the filter comprises an elongate element having a coloured portion and a transparent portion and wherein the transition between said coloured and transparent portions occurs at a sharply defined edge.

11. Apparatus according to claim 10 wherein the sharply defined edge extends obliquely relative to the longitudinal axis of the elongate element.

12. A method of detecting displacement of an object comprising the steps of propagating polychromatic light along a path to a detector; supporting radiation modulation means in predetermined fixed location with respect to the detector; adjusting the path of the polychromatic light in response to the displacement of the object such as to vary the distributed spectral content of the light reaching the detector; detecting the light reaching the detector with at least first and second photo-responsive elements wherein the responsivity with respect to wavelength of the first element is different from that of the second; calculating, from the signals from the photo-responsive elements, the colour of the radiation incident on the detector as represented by two or more parameters on the chromaticity (CIE) diagram; and interpreting the colour of the radiation incident on the detector in terms of the displacement of the object.

* * * * *